UNITED STATES PATENT OFFICE.

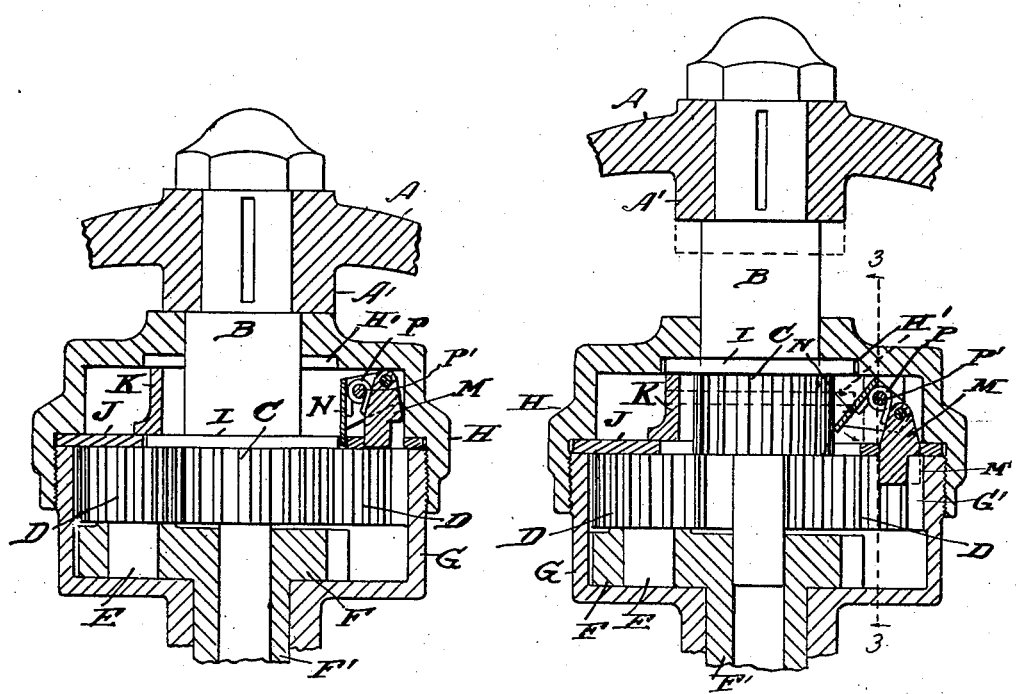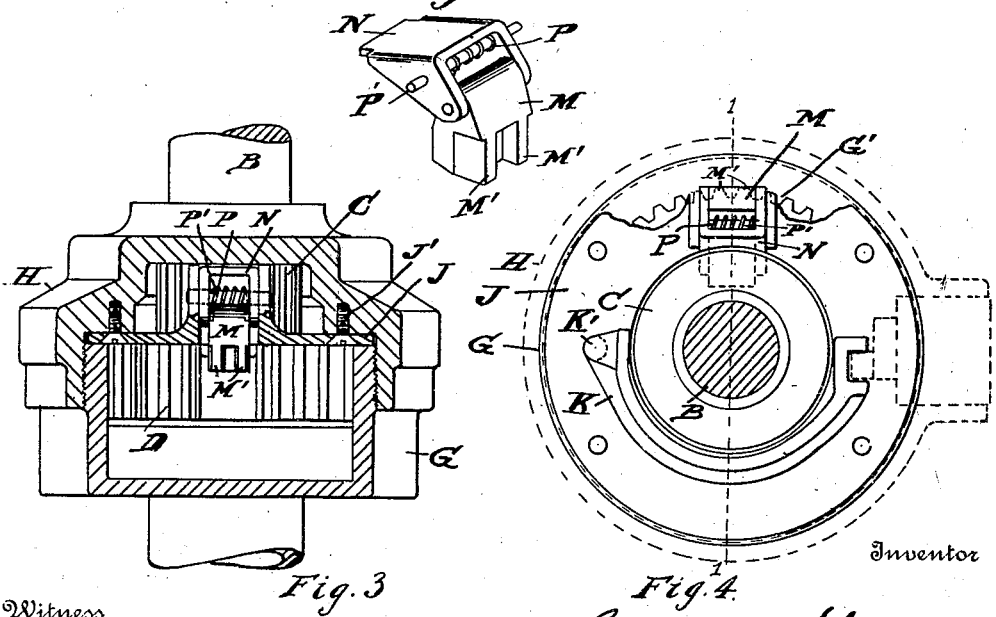

THEODORE D. STANLEY, OF DETROIT, MICHIGAN, ASSIGNOR TO LELAND LOCK COMPANY, OF DETROIT, MICHIGAN, A CORPORATION OF MICHIGAN.

STEERING-WHEEL LOCK.

1,304,516.  Specification of Letters Patent.  Patented May 20, 1919.

Application filed October 3, 1918. Serial No. 256,719.

*To all whom it may concern:*

Be it known that I, THEODORE D. STANLEY, citizen of the United States, residing at Detroit, county of Wayne, State of Michigan, have invented a certain new and useful Improvement in Steering-Wheel Locks, and declare the following to be a full, clear, and exact description of the same, such as will enable others skilled in the art to which it pertains to make and use the same, reference being had to the accompanying drawings, which form a part of this specification.

My invention relates to a steering wheel lock for motor driven vehicles, shown in the accompanying drawings and more particularly pointed out in the following specification and claims.

This invention is designed as an improvement on that described in my application for Letters Patent filed August 7, 1918, Serial No. 248,668, and it particularly relates to the latch or bolt housed in the gear case,—employed to prevent the unauthorized removal of the cover from the gear case when the gear carried by the stub shaft of the steering wheel has been raised and supported in demeshed relation to the remainder of the planetary gearing;—the gear when lowered into meshed relation with the latter being adapted to coöperate in the control of the steering post.

One of the objects of the present invention is to provide a vertically movable bolt pivoted to a rocking arm, in turn actuated by a flange carried by the stub shaft of the steering wheel,—the construction being such that the bolt may be automatically raised when the steering wheel is lowered, or when released from the control of said flange upon the steering wheel being manually raised, will automatically force the bolt down into the gear case and in mesh with the teeth of the internal gear. If it should however not be in exact registration with the teeth of the internal gear when lowered it will immediately enter and engage them upon an attempt to turn or unscrew the cover—in which the latch is supported—from the gear case.

A further object of the invention is to provide a construction by which the latch cannot be forced upwardly to a position whereby the cover may be removed from the gear case through the manipulation of the traction wheels of the vehicle from one side to the other in order to act upon the steering post and thus upon the planetary gearing for the purpose of causing the latch or bolt to be forced upwardly due to the thrust of the gears upon the latch through their rotation back and forth;—as has been found possible in other devices of a somewhat similar nature.

It will thus be seen that the latch will effectively serve to prevent the removal of the gear cover by any maliciously inclined person in an attempt to tamper with the mechanism whereby the steering wheel is maintained in an inoperative relation to the post.

With the foregoing and other objects in view which will appear as the description proceeds, the invention resides in the construction and arrangement of parts and in the details of construction hereinafter described and claimed, it being understood that changes may be made in the precise embodiment of the invention herein described without departing from the spirit of the same.

In the accompanying drawings:—

Figure 1 is a vertical sectional elevation through a fragment of a steering wheel or post, showing the steering wheel in operative control of the post, and the latch for securing the cover of the gear case against removal in released position.—

Fig. 2 is a similar sectional elevation showing the steering wheel supported in released relation to the steering post and the latch lowered to secure the cover of the gear case against removal.

Fig. 3 is a sectional elevation taken on line 3—3 of Fig. 2.

Fig. 4 is a plan view of the gear case with the cover removed—but indicated in dotted lines—showing the annular plate carried by the cover and located between the latter and the gear case broken away to disclose the internal gear below,—with which the latch is adapted to mesh.

Fig. 5 is a perspective view of the latch.

Referring now to the letters of reference placed upon the drawings:—

A, denotes a steering wheel and A¹ its hub keyed to the shaft B. C, indicates a pinion carried by the stub shaft normally in mesh with a plurality of gears D, carried upon studs E, secured to a plate F, at the top of the post F¹ into which the lower end of the stub shaft extends.

G, is a gear case having an internal gear G¹ on its inner periphery with which the gears D are in mesh.

The foregoing is descriptive of a well known steering gear and will require no further explanation here.

H, denotes an annular cover secured upon the gear case G, adapted to receive the pinion C, when manually lifted out of mesh with the gears D, by the steering wheel A.

I, is a flange or washer carried by the stub shaft directly above the pinion C, and when the gear is lifted out of mesh with the co-acting planetary gears is lodged in the recess H¹ in the gear case cover H.

J, is an annular plate secured to a shoulder in the cover H, by screws J¹. K is an arc-shaped swinging arm pivoted at K¹ to the annular plate and is adapted to close over the flange I to maintain the pinion C in mesh with the gears D,—when the steering wheel is in position to operate the steering post,—and to swing under the flange to support the pinion C and steering wheel A in a free or released relation to the operation of the steering post, as fully described in my application for patent previously referred to.

M, denotes a latch or bolt pivoted to an operating lever N which is in turn pivoted in upstanding walls cast integral with the annular plate J.

P, indicates a spring mounted on the shaft P¹ forming the pivot of the lever N, the ends of which respectively bear upon the operating lever N and the latch or bolt M, and serve to raise the lever that it may be acted upon by the flange I, when the steering wheel is lowered into operative relation with the steering post. The spring also acts to force the latch or bolt downward, when the operating lever N is released from the controlling action of the flange I, whereby it is operated.

The bolt M, is preferably constructed with one or more gear teeth M¹, designed to enter between the teeth of the internal gear G¹ on the inner periphery of the gear case when lowered into position to insure against the removal of the cover from the gear case.

Having indicated the several parts by reference letters, the construction and operation of the device will be readily understood.

To render the steering wheel inoperative for actuating the steering post, the arc-shaped arm K is actuated by suitable key mechanism (not shown) so as to permit the pinion C, to be manually lifted by means of the steering wheel out of mesh with the planetary gears D. Upon the flange I entering the recess H¹ of the cover, the spring actuated latch M is free to move under the action of its spring downwardly into the gear case and in mesh with the internal gear G¹,—but should it not register exactly with the teeth of the internal gear when released any attempt to remove the cover of the gear case will cause the bolt to instantly articulate with the teeth of the internal gear, as will be readily understood, thus securing the cover against removal.

The means for supporting the steering wheel with the pinion carried by the stub shaft in an operative or inoperative relation to the steering wheel shaft forms the subject matter of my application for patent previously referred to and therefore requires no detailed description here aside from that necessary to give a proper understanding of the present invention.

Having thus fully described my invention, what I claim is:

1. In a device of the character described, the combination of a steering post fixed against lengthwise movement, a gear case carried by said post, a removable cover screwed to said case, a steering wheel supported by a stub shaft adapted for lengthwise movement with reference to the steering post, planetary gearing housed in the case for operably connecting the stub shaft with the post, means for maintaining the steering wheel in an operative or inoperative relation to the post, a reciprocating bolt supported in the gear case, adapted to enter between the gears to prevent their operation, and a separate spring pressed latch member coöperatively connected with the bolt and actuated by the alternate reciprocating movement of the stub shaft for controlling the operation of the bolt.

2. In a device of the character described, the combination of a steering post fixed against lengthwise movement, a gear case carried by said post, a removable cover screwed to said case, a steering wheel supported by a stub shaft adapted for lengthwise movement with reference to the steering post, planetary gearing housed in the case for operably connecting the stub shaft with the post, means for maintaining the steering wheel in an operative or inoperative relation to the post, a reciprocating bolt supported in the gear case, adapted to enter between the gears to prevent their operation, a tilting arm pivoted to the bolt, means carried by the stub shaft adapted to act upon the tilting arm, and a spring between the bolt and the tilting arm for actuating said parts when released from the control of said means carried by the stub shaft.

3. In a device of the character described, the combination of a steering post fixed against lengthwise movement, a gear case carried by said post, a removable cover screwed to said case, a steering wheel supported by a stub shaft adapted for lengthwise movement with reference to the steering post, planetary gearing housed in the case connecting the stub shaft with the post, means for maintaining the stub shaft and its steering wheel in operative or inoperative relation with the post, a reciprocating bolt having teeth adapted to enter between the gears and engage the teeth of the internal gear, a tilting arm housed within the gear case and pivoted to the reciprocating bolt, a spring adapted to act upon the bolt and tilting arm, and a flange carried by the stub shaft to control the action of the tilting arm and reciprocating bolt.

In testimony whereof, I sign this specification in the presence of two witnesses.

THEODORE D. STANLEY.

Witnesses:
S. E. THOMAS.
ARTHUR F. LEDERLE.